United States Patent
Yamato et al.

(10) Patent No.: US 6,572,143 B2
(45) Date of Patent: *Jun. 3, 2003

(54) AIR BAG GAS INFLATOR

(75) Inventors: Yo Yamato, Hyogo (JP); Mithuhiko Fukabori, Hyogo (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,005

(22) Filed: Aug. 17, 1998

(65) Prior Publication Data

US 2001/0017461 A1 Aug. 30, 2001

(51) Int. Cl.[7] ............................................ B60R 21/26
(52) U.S. Cl. .................. 280/741; 280/737; 280/740
(58) Field of Search ........................ 280/736, 741, 280/734, 728.1, 737, 742, 735, 740

(56) References Cited

U.S. PATENT DOCUMENTS

| | | | | |
|---|---|---|---|---|
| 5,078,422 A | * | 1/1992 | Hamilton et al. | 280/736 |
| 5,330,226 A | * | 7/1994 | Gentry et al. | 280/735 |
| 5,351,988 A | * | 10/1994 | Bishop et al. | 280/737 |
| 5,413,378 A | * | 5/1995 | Steffens, Jr. et al. | 280/735 |
| 5,439,249 A | * | 8/1995 | Steffens, Jr. et al. | 280/735 |
| 5,462,307 A | * | 10/1995 | Webber et al. | 280/737 |
| 5,588,676 A | * | 12/1996 | Clark et al. | 280/741 |
| 5,664,802 A | * | 9/1997 | Harris et al. | 280/736 |
| 5,664,804 A | * | 9/1997 | Saccone | 280/737 |
| 5,700,030 A | * | 12/1997 | Goetz | 280/736 |
| 5,709,406 A | * | 1/1998 | Buchanan | 280/737 |
| 5,851,029 A | * | 12/1998 | Klinger et al. | 280/736 |
| 5,906,394 A | * | 5/1999 | Van Wynsberghe et al. | 280/737 |
| 5,941,562 A | * | 8/1999 | Rink et al. | 280/737 |

* cited by examiner

Primary Examiner—F. Zeendeer
(74) Attorney, Agent, or Firm—Birch, Stewart, Kolasch & Birch, LLP

(57) ABSTRACT

A gas generator for an air bag that can adjust gas providing amount according to circumstance is provided. The gas generator includes an outer shell vessel, an ignition unit disposed within the vessel, a gas generating material for generating a gas in response to the operation of the ignition unit, a gas generating material accommodation chamber for accommodating the gas generating material therein, and a gas discharge chamber isolated from the gas generating material accommodation chamber by a partition member, wherein the gas discharge chamber includes a discharge port that makes the inside of the gas discharge chamber communicate with the atmosphere, and a gas discharge unit which is operated upon receiving an operating signal, for rupturing the partition member to discharge the gas.

7 Claims, 2 Drawing Sheets

AIR BAG GAS INFLATOR

DETAILED DESCRIPTION OF THE INVENTION

1. Field of the Art to Which the Invention Pertains

The present invention relates to a gas generator for an air bag that protects a driver or a passenger from an impact, and more particularly to a gas generator capable of adjusting the amount of a supply gas in accordance with the circumstances.

2. Prior Art

For the purpose of protecting a driver or a passenger from an impact of a vehicle collision, a vehicle is equipped with an air bag device. The air bag device includes a sensor, a control unit, a gas generator, an air bag, etc. The gas generator includes an ignition unit and a gas generating material.

Upon detection of an impact by the sensor, a detection signal is supplied to the control unit which conducts arithmetic calculation in response to the detection signal. The control unit generates an output signal representative of the result of the arithmetic calculation to the ignition unit of the gas generator. The ignition unit is thus operated. With this operation, the gas generating material is burned to generate a gas having a high temperature and a high pressure. The gas is injected into the air bag (bag body) from a diffuser of the gas generator. As a result, the air bag is inflated to form a cushion that absorbs an impact between a solid structure and the driver or the passenger.

In a conventional gas generator for an air bag device, the capacity of an air bag, the amount of gas generating material, and so on are determined such that an optimum inflation rate of the air bag, an optimum internal pressure in the air bag, etc., are obtained on the presumption of a certain standard condition. However, there may occur a case where a preset condition is changed depending on a vehicle velocity, a vehicle room temperature, a physique of a driver or a passenger, a sitting posture of the driver or the passenger, whether the driver or the passenger is being restrained by a seat belt or not, and so on at the time of operating the air bag device. In such a situation, with a certain standard amount of a supply gas, the optimum inflation rate of the air bag, the optimum internal pressure in the air bag, and so on cannot be obtained.

SUMMARY OF THE INVENTION

The object of the present invention is to provide a gas generator for an air bag which is capable of adjusting the amount of a supply of gas in accordance with the circumstances.

The gas generator for an air bag, according to the present invention, includes: an outer shell vessel having a pressurized gas accommodating chamber for storing a gas therein, and a diffuser nozzle, provided at a opening of the outer shell vessel, having gas discharge ports in communication with the air bag, the opening being covered by a first rupturable partition member;

ignition means disposed within the outer shell vessel and operates upon receiving an operation signal; and gas generating means for generating gas when the ignition means operates, wherein the outer shell vessel includes a gas discharge chamber attached thereto at a position isolated from the diffuser nozzle, and provided over a second rupturable partition member, the gas discharge chamber including a gas discharge port that communicates an inner space thereof with an atmosphere, and the gas discharge chamber having a gas discharge member that ruptures the second partition member to discharge gas upon receiving another operation signal.

It is preferable that the second partition member is formed of a rupturable gas sealing plate that seals the second opening.

Also, it is preferable that the second partition member has a rupturable tube-shaped body that protrudes into the gas discharge chamber. A notch groove may be formed in the outer periphery of the tube-shaped body.

The gas generating means can mainly be made of any one of a solid gas generating agent, pressurized gas, and a liquid which is gasified by heating.

Also, the gas discharge means can be provided with a piston member which ruptures the partition member.

The piston member may have a sharp tip or a flat tip.

The gas discharge means can be formed of an electric ignition unit.

In the gas generator of the present invention, the second partition member isolates the pressurized gas accommodation chamber of the outer shell vessel from the gas discharge chamber. The gas discharge member operates upon receiving an operating signal to rupture the partition member. In this situation, a part of the pressurized gas enters the gas discharge chamber, through the ruptured opening, and then discharges from the discharge port of the gas discharge chamber to the atmosphere. When the gas discharge means is inoperative, the entire amount of the generated gas is provided to the air bag. In this way, the gas generator of the present invention can adjust the amount of supply gas according to the circumstances. The operating signal can be obtained from the control means in the air bag device containing the gas generator of the present invention therein. The control means inputs detection signals from a variety of sensors such as a vehicle velocity sensor, a temperature sensor that detects the vehicle room temperature, a displacement sensor for detecting a physique of a driver or a passenger, a sitting posture of the driver or the passenger, etc., to arithmetically calculate the detection signal, thus outputting a signal representative of the arithmetical calculation result.

As described in the foregoing, the present invention realizes a gas generator that can adjust the gas supply amount in accordance with the situation. Namely, the gas generator discharges a part of the gas, by activating the gas discharge member, to optimize internal pressure of the air bag.

DETAILED DESCRIPTION OF THE PREFERRED EMBODIMENTS

Figure 1:
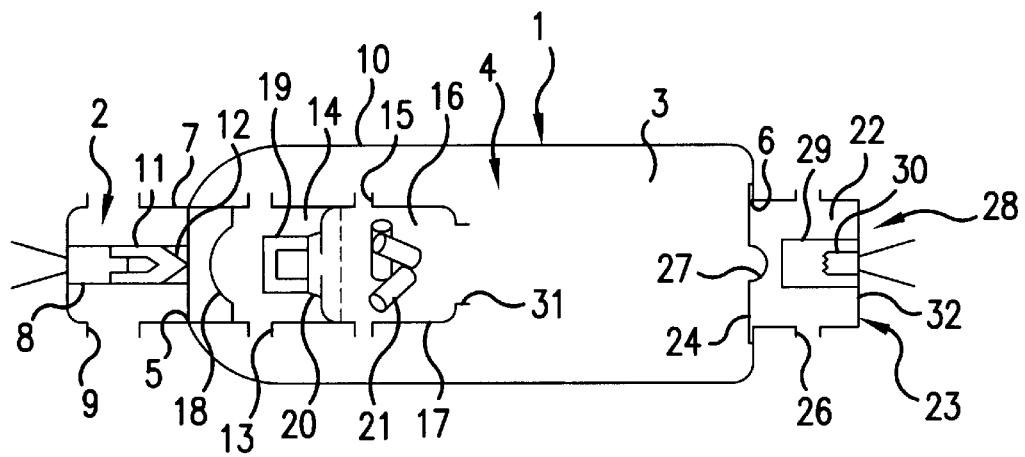
FIG. 1 is a schematic cross-sectional view showing a gas generator for an air bag in accordance with one embodiment of the present invention.

Now, a description will be given below in more detail of various embodiments of the present invention. FIG. 1 is a schematic diagram showing a gas generator for an air bag in accordance with one embodiment of the present invention. The gas generator is a gas generator for a passenger side seat. The gas generating means is formed of a hybrid-type gas generator using a pressurized gas. The gas generator includes an outer shell vessel 1, an ignition unit 2 disposed within the vessel 1, pressurized gas 3 stored in the vessel, and a pressurized gas accommodation chamber 4 for accommodating the pressurized gas 3.

The outer shell vessel 1 has a cylindrical body 10 having openings 5 and 6 in both ends thereof. An opening of a cylindrical diffuser nozzle 7, one end of which is closed, is attached to the one end opening 5. The diffuser nozzle 7 has a gas discharge outlet 9 communicating with the air bag in the outer peripheral wall thereof and a sleeve member 11 inside thereof, and the ignition unit 2 is disposed inside the sleeve member 11.

The ignition unit 2 includes an igniter vessel 8, which is filled with an igniter, and an injection body 12, which is fitted in the vessel 8 to be slidable within the sleeve member 11.

The pressurized gas 3 is accommodated within the pressurized gas accommodation chamber 4 which is made of a main body 10. The pressurized gas can be an inert gas, for example, argon, nitrogen, helium, or the like, and is filled into a piston member accommodation chamber 14 through an opening 13, and into a gas generating agent accommodation chamber 16 through openings 31 and 15.

The pressurized gas accommodation chamber 4 accommodates the pressurized gas 3 as well as a cylindrical member 17 therein. The cylindrical member 17 has both ends thereof being opened, and one opened end is connected to the opening 5 of the main body 10. Within the cylindrical member 17, a gas tight-sealing wall 18, which closes the first opening as the first partition member, a piston member 19, a booster 20, and a gas generating agent 21, are disposed. The gas tight-sealing wall 18 is formed of a rupturable thin film and disposed between the injection body 12 and the opening 13 to tight-sealingly isolate the inside of the diffuser nozzle 7 from the pressurized gas accommodation chamber 4.

The gas generator of this embodiment has a gas discharge chamber 22. The gas discharge chamber 22 is made of a cylindrical member 23, one end of which is closed and the other end of which is opened, so that the opened end of the cylindrical member 23 is connected to the second opening 6 of the main body 10. A second partition member, that is, a gas sealing plate 24 is disposed in the second opening 6 and closes the second opening 6. The outer peripheral portion of the gas sealing plate 24 is fixed to a peripheral edge portion of the opening 6 by welding, and the central portion thereof has a brittle weak portion 27. The gas sealing plate 24 isolates the gas discharge chamber 22 from the pressurized gas accommodation chamber 4. The gas discharge chamber 22 has a discharge port 26, which is defined in the outer peripheral wall of a cylindrical member 23 to make the inside of the gas discharge chamber communicate with the atmosphere. The discharge port 26 is arranged at a position where a gas injected from the discharge hole 26 does not blow towards the driver or the passenger, and if this condition is satisfied, the discharge port 26 may be disposed in an end wall 32. The number and the area of the discharge port 26 can be appropriately selected in accordance with a required performance.

Within the gas discharge chamber 22, a gas discharge unit 28 is located. The gas discharge unit 28 is made of a pyrotechnic vessel 29 for accommodating a pyrotechnic therein and a nichrome wire 30 disposed in the pyrotechnic vessel 29 and heated by electrification. The top of the pyrotechnic vessel 29 is positioned close to the brittle weak portion 27 of the gas sealing plate so that the explosion force is concentrated on the brittle weak portion 27. The gas discharge unit 28 operates upon receiving an operating signal so that it ruptures the brittle weak portion 27 of the gas sealing plate to discharge the gas. It should be noted that the gas discharge means may be formed of an electric ignition unit used as the ignition unit of the gas generator.

In the gas generator thus organized in accordance with this embodiment, upon sensing an impact by a sensor (not shown), a detection signal is supplied to a control unit (not shown), which arithmetically calculates the detection signal to generate an output signal representative of the arithmetic operation result, and the output signal is supplied to the ignition unit 2. In this operation, the heating body within the igniter vessel 8 is heated, thereby burning the ignition unit to generate a gas. The pressure of the generated gas moves the ignition body 12 to rupture the gas tight-sealing wall 18. In this situation, the pressurized gas 3 of the pressurized gas accommodation chamber 4 is injected into the air bag (not shown) through the gas discharge outlet 9 of the diffuser nozzle 7. The air bag is inflated at a relatively low rate. When the injection body 12 further moves and hits the piston member 19, the booster 20 is ignited, and the ignition of the booster 20 burns the gas generating agent 21. The combustion gas is injected from the openings 31 and 15, and is then mixed with the pressurized gas 3 and heats the pressurized gas 3. The mixed gas consisting of the pressurized gas 3 which is expanded by heating and a combustion gas of the gas generating agent 21 is injected into the air bag through the opening 13 and the gas discharge outlet 9. Because the mixed gas is newly added, the inflation rate of the air bag is thereafter increased. As a result, the air bag forms a cushion in front of the driver or the passenger, thereby protecting the driver or the passenger from the impact.

The gas generator of the present invention can adjust the amount of supply gas by controlling the operation of the gas discharge unit 28. For example, when the vehicle room temperature is high, the air bag is inflated with an excessive internal pressure. In such a case, the gas discharge unit 28 of the gas generator is operated in response to the operating signal from the control unit. When the nichrome wire 30 is heated in accordance with the operating signal, then the pyrotechnic within the pyrotechnic vessel 29 is ignited to produce an explosion force that ruptures the brittle weak portion 27 of the gas sealing plate. As a result, the pressurized gas accommodation chamber 4 communicates with the gas discharge chamber 22 so that the gas within the pressurized gas accommodation chamber 4 enters the gas discharge chamber 22 through the ruptured opening and then discharges from the discharge port 26 of the gas discharge chamber 22 to the atmosphere. As a result, the air bag is inflated with an appropriate internal pressure.

Figure 2:
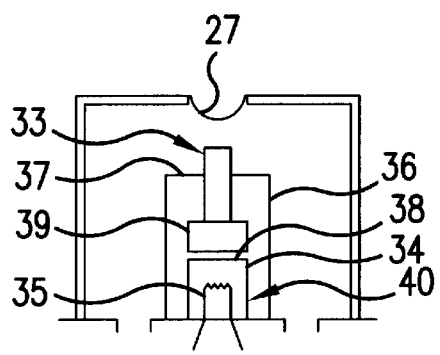
FIG. 2 is a schematic cross-sectional view showing gas discharge means of the gas generator in accordance with another embodiment of the present invention.

FIG. 2 shows gas discharge means of the gas generator in accordance with another embodiment of the present invention. The gas discharge means is made of an electric ignition unit 40 that includes a piston member 33 disposed to rupture the brittle weak portion 27 of the gas sealing plate. The electric ignition unit 40 is made of a vessel 34 that accommodates a pyrotechnic that drives the piston member 33 therein and a nichrome wire 35 within the vessel 34.

The piston member 33 and the vessel 34 are disposed within the cylindrical member 36, and the tip of the piston member 33 is fitted into a central hole defined in an end wall 37 of the cylindrical member 36. The piston member 33 can be supported by a diaphragm disposed in its outer periphery, or may be fixed to an end surface 38 of the vessel 34. A jaw portion 39 of the piston member 33 and an end wall 37 of the cylindrical member 36 function as a stopper.

Upon heating the nichrome wire 35 in response to the operating signal from the control means, the pyrotechnic within the vessel 34 is ignited to produce an explosion force that moves the piston member 33 to rupture the brittle weak portion 27.

Figure 3:
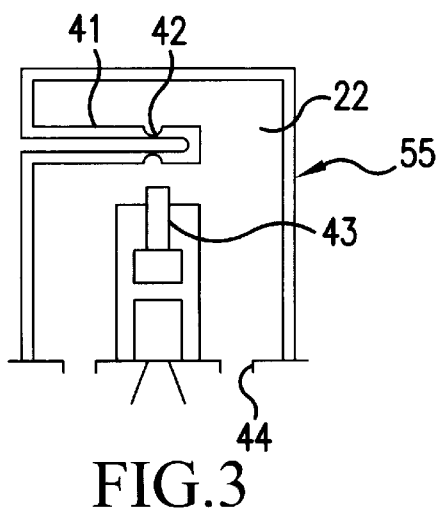
FIG. 3 is a schematic cross-sectional view showing a partition member of the gas generator in accordance with a still another embodiment of the present invention.

FIG. 3 shows the second partition member of the gas generator in accordance with a still another embodiment of the present invention. The partition member 55 has a rupturable tube-shaped body 41 that protrudes into the gas discharge chamber 22. In the outer peripheral portion of the tube-shape body 41, a brittle portion, that is, a notch groove 42 is formed. The notch groove 42 is positioned in line with the moving direction of the piston member 43 in combination with the electric ignition unit. The inside of the tube-shaped body 41 communicates with the pressurized gas accommodation chamber. When the piston member 43 moves in accordance with the operation of the electric ignition unit and hits the tube-shaped body 41, the tube-shaped body 41 is ruptured at the notch groove 42 of the tube-shaped body, and in this situation, a gas within the pressurized gas accommodation chamber passes through the ruptured opening of the tube-shaped body 41 and then enters the gas discharge chamber 22 before being discharged into the atmosphere from the discharge port 44 of the gas discharge chamber 22.

Figure 4:
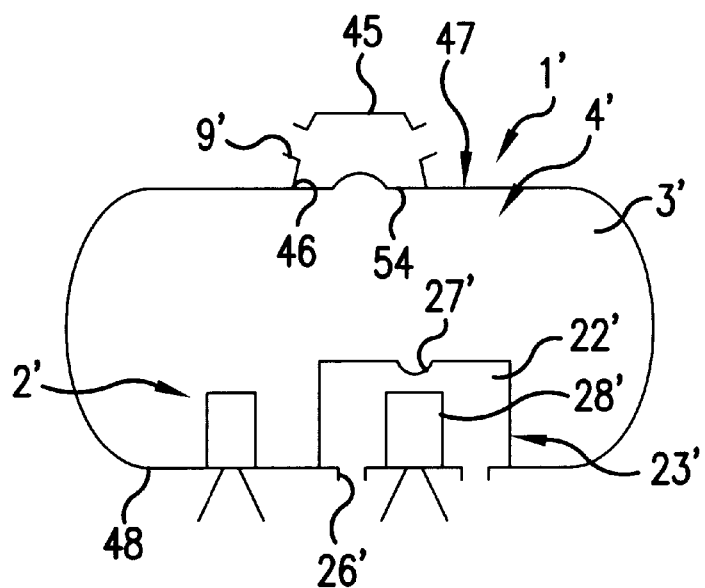
FIG. 4 is a schematic cross-sectional view showing a gas generator for an air bag in accordance with a yet another embodiment of the present invention.

FIG. 4 is a schematic cross-sectional view showing a gas generator for an air bag in accordance with a yet another embodiment of the present invention. The gas generator is for a driver seat, and gas generating means is a hybrid gas generator using a pressurized gas.

The gas generator includes an outer shell vessel 1', ignition unit 2' disposed within the vessel 1', pressurized gas 3' stored in the vessel 1', and a pressurized gas accommodation chamber 4' for accommodating the pressurized gas 3'.

The outer shell vessel 1' has a main body 47 which is elliptic in section and the first opening 46 in the center of the upper portion of the main body 47. The opening 46 is connected with an opening of a diffuser nozzle 45 which is formed of a conical protrusion with a flat head portion. The first opening 46 is air-tightly closed by a first partition member 54, which is a gas tight-sealing wall designed to be ruptured by a predetermined gas pressure. The pressurized gas 3' is accommodated in the pressurized gas accommodation chamber 4', which is formed of the main body 47, and a gas discharge outlet 9' is disposed in the outer peripheral wall of the diffuser nozzle 45.

Figure 5:
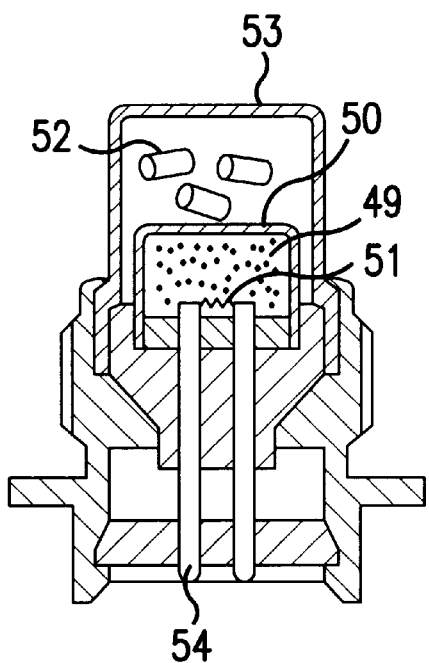
FIG. 5 is an enlarged cross-sectional view showing ignition means of the gas generator of the embodiment.

The ignition unit 2', as shown in FIG. 5, includes an igniter vessel 50, which is filled with an igniter 49, a resistance heating body disposed within the vessel 50, that is, a nichrome wire 51, and a gas generating agent vessel 53 that is disposed to surround the vessel 50 and accommodates a solid gas generating agent 52 inside thereof. The nichrome wire 51 is connected to an electric connector pin 54 to be heated by electricity. The igniter may be made of, for example, a mixture of $KClO_4$ (potassium perchlorate) and Zr (zirconium). A gunpowder can be disposed within the gas generating agent vessel 53 instead of the gas generating agent, or together with the gas generating gent.

The gas discharge chamber 22' of the gas generator in accordance with the present invention is formed of a cylindrical member 23', one end of which is closed and the other end of which is opened. The cylindrical member 23' forms a second partition member having a brittle weak portion 27' formed at one end thereof and the other end being air-tightly fixed to the bottom portion 48 of the main body 47. A discharge port 26' is defined in the bottom portion 48 in the gas discharge chamber, which makes the gas discharge chamber 22' communicate with the atmosphere. A gas discharge unit 28' is disposed in the gas discharge chamber 22'. The structure of the gas discharge unit 28' is identical to that of the gas discharge unit 28 shown in FIG. 1, and therefore the description will be omitted.

In the gas generator thus organized in accordance with this embodiment, upon sensing an impact by a sensor, a detection signal is supplied to the control unit, which arithmetically calculates the detection signal to generate an output signal representative of the arithmetic calculation result, and the output signal is supplied to the ignition unit 2'. In the ignition unit 2', the nichrome wire 51 is heated by electricity, thereby igniting and burning the igniter 49 to generate a gas with a high temperature and a high pressure. The gas ruptures the wall of the ignitor vessel 50 and ignites the gas generating agents 52 outside thereof. Then, the gas generating agents are burned to generate a gas with a high temperature and a high pressure. The gas ruptures the wall of the gas generating agent vessel 53 and is injected into the pressurized gas accommodation chamber 4' outside thereof. The injected gas is mixed with the pressurized gas 3' within the pressurized gas accommodation chamber 4' and also heats the pressurized gas 3'. The pressurized gas is inflated by heating, and the mixed gas consisting of the pressurized gas, which is inflated, and gas generated by the gas generating agent of the ignition means ruptures the gas tight-sealing wall 54 and is injected into the air bag through the gas discharge outlet 9'.

In the gas discharge unit 28' of the gas generator according to the present invention, the gas discharge unit 28' is operated in response to the operating signal from the control unit in such a manner that its explosion force ruptures the brittle weak portion 27'. As a result, the gas within the pressurized gas accommodation chamber 4' enters the gas discharge chamber 22' through the ruptured opening and is discharged to the atmosphere through the discharge port 26'. With this operation, the air bag is inflated with an appropriate internal pressure.

What is claimed:

1. A gas generator for an air bag, comprising:
    an outer shell vessel having a pressurized gas accommodating chamber for storing a gas therein, and a diffuser nozzle provided at a first opening provided in said outer shell vessel, said first opening being covered by a rupturable partition wall, said diffuser nozzle having gas discharge ports in communication with the air bag;
    an ignition unit disposed within said outer shell vessel and operates upon receiving an operation signal;
    gas generating means disposed within said outer shell vessel for generating gas when said ignition unit operates;
    a partition member covering a second opening provided in said outer shell vessel;
    a gas discharge chamber disposed over said partition member, said gas discharge chamber having a gas discharge port which communicates the inside of the chamber with an atmosphere outside the chamber; and a gas discharging unit which activates upon receiving another operation signal, said gas discharging unit breaking said partition member to discharge the gas from said outer shell vessel to the atmosphere through said gas discharge chamber, said gas discharging unit including a non-hollow piston member having a first flat tip facing said partition member and a second flat tip facing a pyrotechnic vessel that projects the piston member towards said partition member to break said partition member by the first flat tip.

2. A gas generator for an air bag as claimed in claim 1, wherein said partition member is formed of a rupturable gas sealing plate.

3. A gas generator for an air bag as claimed in claim 1, wherein said gas generating means consists mainly of any one of a solid gas generating agent, a pressurized gas, and a liquid, which is gasified by heating.

4. A gas generator for an air bag as claimed in claim 1, wherein said gas discharging unit includes an electric ignition unit that ignites pyrotechnic material provided in said pyrotechnic vessel.

5. A gas generator for an air bag, comprising:

an outer shell vessel having a pressurized gas accommodating chamber for storing a gas therein, and a diffuser nozzle provided at a first opening provided in said outer shell vessel, said first opening being covered by a rupturable partition wall, said diffuser nozzle having gas discharge ports in communication with the air bag;

ignition means disposed within said outer shell vessel and operates upon receiving an operation signal;

gas generating means disposed within said outer shell vessel for generating gas when said ignition means operates;

a partition member having a gas discharge port which communicates the inside of the partition member with an atmosphere outside the partition member; and gas discharging means including, a cylindrical rupturable tube-shaped body having a conduit therein and protruding into said partition member, a first end of said conduit being in fluid communication with inside of said outer shell vessel, and a second end of said conduit being closed, said tube-shaped body being formed with a brittle portion that breaks a portion of said tube-shaped body to discharge the gas from said outer shell vessel to the atmosphere through a broken portion of said tube-shaped body, and a piston member and a pyrotechnic vessel that projects the piston member towards said brittle portion to break said tube-shaped body.

6. A gas generator for an air big as claimed in claim 5, wherein said gas generating means consists mainly of any one of a solid gas generating agent, a pressurized gas, and a liquid, which is gasified by heating.

7. A gas generating for an air bag as claimed in claim 5, wherein said gas discharging means includes an electric ignition unit that ignites pyrotechnic material provided in said pyrotechnic vessel.

* * * * *